United States Patent Office.

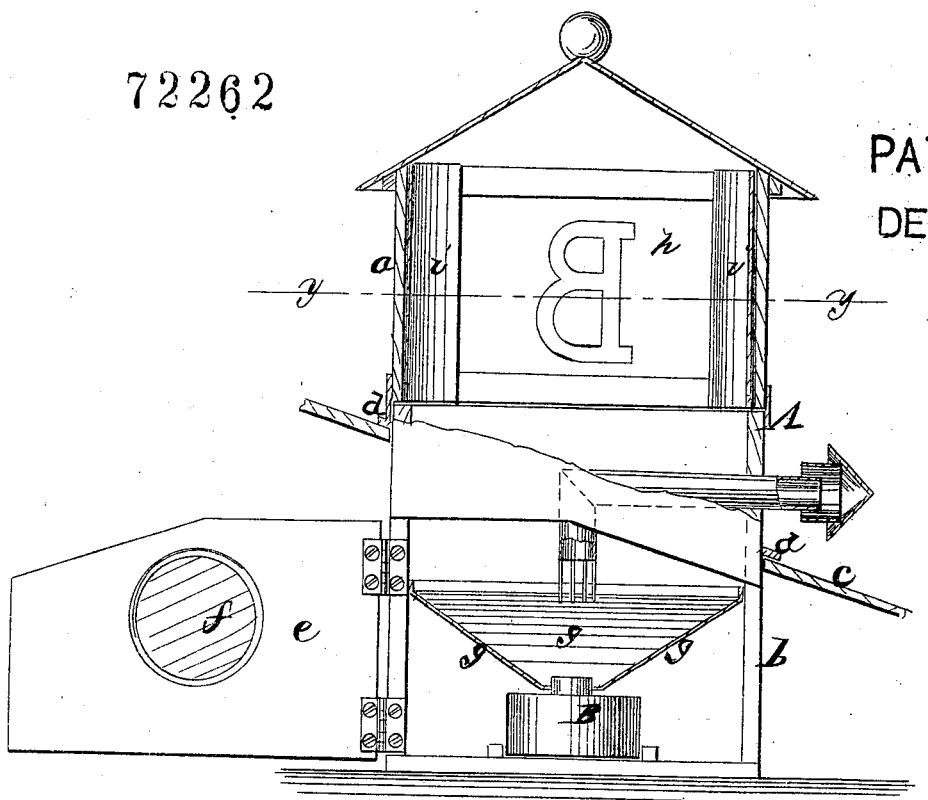

L. V. BADGER, OF CHICAGO, ILLINOIS.

Letters Patent No. 72,262, dated December 17, 1867.

---

IMPROVEMENT IN SIGNAL-LANTERNS.

---

The Schedule referred to in these Letters Patent and making part of the same.

---

TO ALL WHOM IT MAY CONCERN:

Be it known that I, L. V. BADGER, of Chicago, in the county of Cook, and State of Illinois, have invented a new and improved Signal-Lantern for street-railroad cars; and I do hereby declare that the following is a full, clear, and exact description thereof, which will enable others skilled in the art to make and use the same, reference being had to the accompanying drawings, forming part of this specification.

The object of this invention is to obtain a signal-lantern for street-railroad cars, which may be applied to any car without any difficulty whatever, be readily changed from one car to another, and have the advantage of being capable of adjustment in a more conspicuous place than those now used. In the accompanying sheet of drawings—

Figure 1 is a sectional elevation of my invention, taken in the line $x\ x$, fig. 2.

Figure 2 is a horizontal section of the same, taken in the line $y\ y$, fig. 1.

Similar letters of reference indicate like parts.

A represents a rectangular box, composed of two parts, $a\ b$, the upper part, $a$, being above the roof $c$ of the car, and the lower part, $b$, below it, as shown clearly in fig. 1. An opening is made in the roof $c$ of the car, to admit of the box being inserted in it, the part $b$ having cleats or moulding $d$ attached to rest on the roof, all around the opening, and prevent leakage. If necessary or desired, a packing of India rubber or other suitable material may be interposed between the cleats or mouldings and the car-roof.

The lower part, $b$, of the box is provided with a door, $e$, having a glass or lens, $f$, in it, to admit of the interior of the car being lighted, and the lamp B is inserted in the part $b$, and also inclined reflectors, $g$, the angle of inclination of the latter being such as to reflect the rays of light from the lamp upward into the upper part, $a$, of the box.

Two opposite sides, $h\ h$, of the upper part, $a$, of the box are of glass, colored or provided with any suitable or desired character or letter, and at the ends of $a$ there are placed reflectors $i$, having such a position as to cast the rays of light towards the glass sides $h\ h$, while the under surface of the top or roof of the part $a$ constitutes inclined reflectors, to throw the rays of light downward.

The upper part, $a$, of the box may be attached to the lower part, $b$, by any suitable fastening.

By this arrangement the interior of the car will be lighted, while the signal will be above the roof of the car, and consequently very conspicuous. At present the signal-lamps are placed in the ends of the car, below the roof, and are not discernible at a great distance. I propose to use the signal-lanterns on each car, one near each end.

I claim as new, and desire to secure by Letters Patent—

A signal-lantern for street-railroad cars, composed of a box inserted in the roof, and provided with a lamp, reflectors, and glass or transparent sides, substantially in the manner as herein shown and described.

The above specification of my invention signed by me, this 9th day of February, 1867.

L. V. BADGER.

Witnesses:
WM. C. STORY,
E. S. CUTTS.